C. T. DAY.
WIRE STRIPPER.
APPLICATION FILED DEC. 2, 1919.
1,349,563.
Patented Aug. 17, 1920.
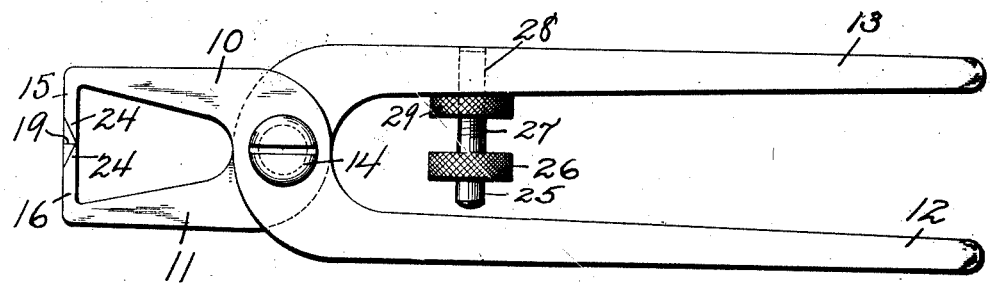
Fig. 1
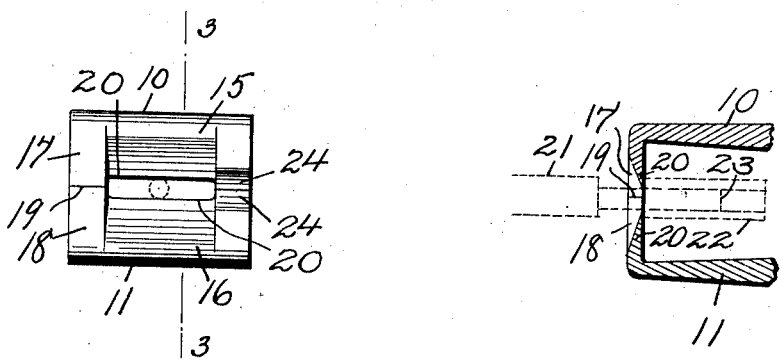
Fig. 2
Fig. 3
Charles T. Day, INVENTOR
BY Wm H. Caufield, ATTORNEY.

UNITED STATES PATENT OFFICE.

CHARLES T. DAY, OF OCEANPORT, NEW JERSEY.

WIRE-STRIPPER.

1,349,563.

Specification of Letters Patent.  Patented Aug. 17, 1920.

Application filed December 2, 1919. Serial No. 341,972.

*To all whom it may concern:*

Be it known that I, CHARLES T. DAY, a citizen of the United States, and a resident of Oceanport, county of Monmouth, and State of New Jersey, have invented certain new and useful Improvements in Wire-Strippers, of which the following is a specification.

This invention relates to a wire stripper for cutting the insulation from the end of a wire, and while it takes all the insulation from the wire, it does not cut into the wire itself, that is, the metal core is not damaged. Such damage is important, because when the wire is bent to make a connection it very often breaks if it is cut into, and it requires a new stripping, which wastes wire and also in many cases makes the wire too short.

In my improved wire stripper the stripping edges are separated when the jaws are in their closed positions, the separation equaling the diameter of the metallic core, and the edges are straight and substantially parallel so that an approximation of location is all that is necessary in engaging the wire.

Wire strippers have been made in which circular openings, the edges of which form the stripping edges, have been employed, but in this device, if the opening, which is of about the same diameter as the core of the wire, is not exactly in position, that is, if, when the jaws are closed, this opening is eccentric to the wire, on one side of the wire the insulation is not cut through and on the other side the edge of the wire is cut. The use of such strippers is slow, since great care must be exercised in placing the wire at exactly the right point in the stripper, whereas in my improved structure the work can be quickly and thoroughly done, since the position of the wire anywhere between the stripping edges is sufficient to insure the insulation being cut and the wire itself left undamaged.

The invention further comprises cutting edges which can be used in conjunction with the stripping edges for severing the wire, thus providing for a convenient means for both cutting and stripping the wire.

The invention is illustrated in the accompanying drawing, in which Figure 1 is a side view of one form of my improved stripping tool. Fig. 2 is a face view of the jaws illustrated in Fig. 1, and Fig. 3 is a section through the jaws, taken on the plane indicated by the line 3—3 in Fig. 2.

The jaws 10 and 11 are adapted to be swung apart and together, being preferably provided with the extensions forming the handles 12 and 13, respectively, being pivoted by a bolt 14 and being used in the same manner as an ordinary pair of pliers.

The jaws are separated so as to permit the insertion of a wire between them and have the inwardly projecting ends 15 and 16, these ends having cheek pieces 17 and 18, the faces of which abut, as at 19, so as to limit the movement of the jaws toward each other.

Set back from the abutting faces 19 are the stripping edges 20, which are of material length and are substantially parallel and are also straight, so that when they are closed they are separated by a distance equal to the diameter of the metal core of the wire that is to be stripped. The edges being straight, there are no projections to nick into the side edges of the wire, and if the wire is grasped anywhere along the length of the two stripping edges 20, and then the pliers turned to the right and left by a wrist motion, as is usual in operations of this kind, the insulation 21 is cut and the end 22 can then be stripped from the metal core 23, as clearly shown in Fig. 3.

If desired, the jaws can have the cutting edges 24 placed on the side of the stripping edges opposed to the cheek pieces 17 and 18 and thus form a tool for cutting entirely through the wire. A tool can thus be provided for a fixed gage of wire and the stripping parts thereof can not injure the wire when it is used thereon, and a different size plier can be used for a larger gage of wire, but if the same stripper is desired for a larger gage of wire than the one it is designed for, I provide an adjustable stop, the form shown comprising a stud 25 with a suitable hand piece 26 and a screw-threaded end 27 fitting into the hole 28 in one of the handles and having its free end adapted to engage the other handle when the stud 25 is screwed up, and in this way the movement of the handles, and consequently of the jaws toward one another, is limited.

A suitable lock nut 29 can be provided for holding the stud in its adjusted positions. I prefer to make the stripping edges 20 of a length considerably greater than the distance that separates them when the jaws are shut, thus providing plenty of room so that when the wire is grasped no time need be wasted in a fine adjustment of the location of the wire within the stripping device.

I claim:

1. A wire stripper comprising opposed jaws with substantially parallel stripping edges, the jaws being constructed so as to permit the placing of said edges transversely on a wire, whereby a pull on said jaws when they are closed will draw the edges longitudinally of the wire to strip the insulation therefrom.

2. A wire stripper comprising opposed jaws with substantially parallel stripping edges of material length, the jaws being constructed so as to permit the placing of said edges transversely on a wire, whereby a pull on said jaws when they are closed will draw the edges longitudinally of the wire to strip the insulation therefrom, and means for limiting the movement of the jaws toward each other so that the edges are separated when the jaws are shut.

3. A wire stripper comprising opposed pivoted jaws with faces adapted to abut, cutting edges adapted to engage an element to sever it, and stripping edges of material length and substantially parallel and set back from the abutting faces so that the stripping edges are spaced apart when the jaws are shut, said abutting faces, cutting edges and stripping edges being substantially alined in a plane parallel to the axis of the pivot of the jaws.

In testimony that I claim the foregoing, I have hereto set my hand, this 1st day of December, 1919.

CHARLES T. DAY.